(No Model.)
J. F. HUGHES.
KNEADING MACHINE.
No. 353,065. Patented Nov. 23, 1886.
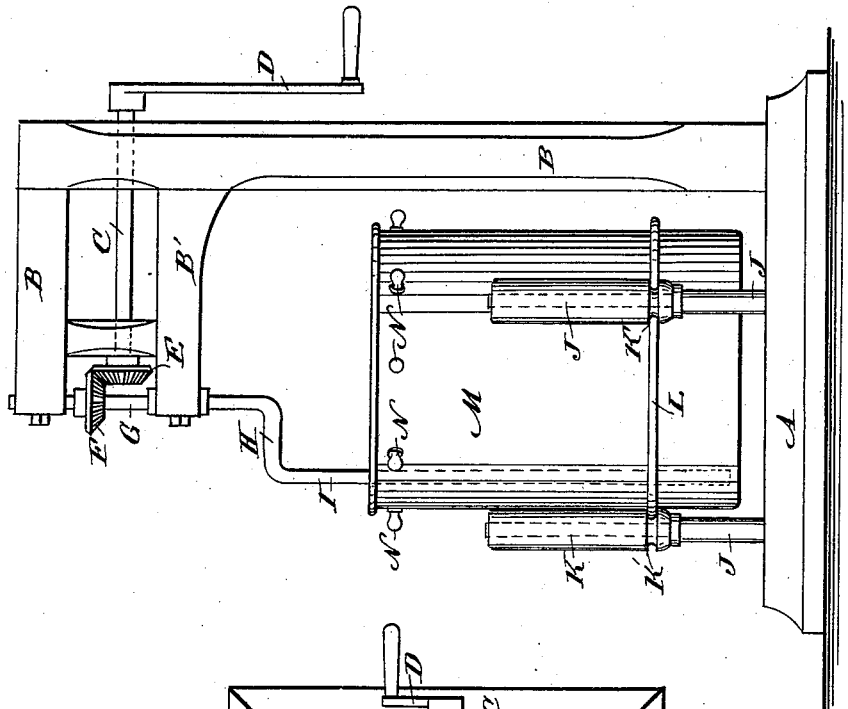
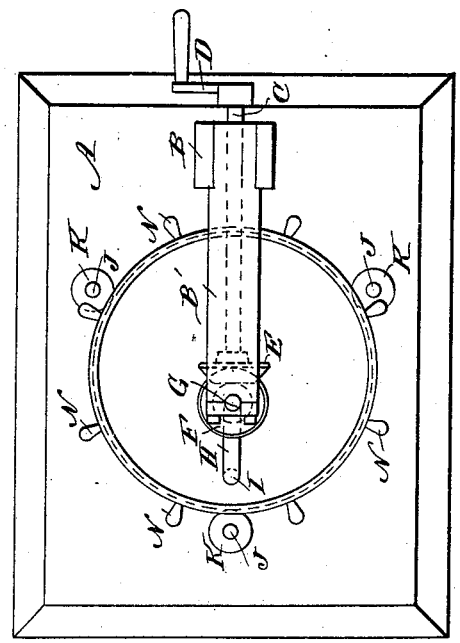
WITNESSES:
C. Neveux
C. Sedgwick
INVENTOR:
J. F. Hughes
BY Munn & Co
ATTORNEYS.

UNITED STATES PATENT OFFICE.

JAMES F. HUGHES, OF GEORGETOWN, TEXAS.

KNEADING-MACHINE.

SPECIFICATION forming part of Letters Patent No. 353,065, dated November 23, 1886.

Application filed June 2, 1886. Serial No. 203,910. (No model.)

*To all whom it may concern:*

Be it known that I, JAMES F. HUGHES, of Georgetown, in the county of Williamson, and the State of Texas, have invented a new and Improved Kneading-Machine, of which the following is a full, clear, and exact description.

The object of my invention is to provide a new and improved kneading-machine which thoroughly and quickly kneads the dough, which is not touched by the operator.

The invention consists of various parts and details, and combinations of the same, as will be fully described hereinafter, and then pointed out in the claims.

Reference is to be had to the accompanying drawings, forming a part of this specification, in which similar letters of reference indicate corresponding parts in both figures.

Figure 1 is a side elevation of my improvement, and Fig. 2 is a plan view of the same.

On the platform A is fastened the standard B, on which is mounted the horizontal shaft C, provided on one end with a crank-arm, D, and on the other end with a bevel gear-wheel, E, which meshes into a bevel gear-wheel, F, attached to a vertical shaft, G, which has its bearings in the cross-arms B', secured on the standards B. The shaft G has an angular arm, H, on its lower end, to which arm H is secured the vertical rod I, extending downward very nearly to the bottom of the tray M.

To the platform A are secured the upright rods J, on each of which turns a roller, K, provided with a recess, K', into which fits a ring, L, attached to the receptacle or tray M, which is thus supported and guided by the rollers K, a short distance above the platform A. The tray or receptacle M is provided on its outside, near its upper end, with knobs or handles N. The vertical shaft I and the tray M are eccentric to each other, so that the vertical rod I very nearly touches the shell of the receptacle M when in its outer position, as shown in the figures, and in the opposite position it is at or near the vertical axis of the tray M.

The operation is as follows: The flour, seasoning, and liquids are placed in the tray or receptacle M, and then the operator turns with one hand the crank-arm D, which causes the vertical rod I to rotate in the receptacle M, and at the same time the operator takes hold of the knobs or handles N with his other hand and turns the tray or receptacle forward till the dough adheres to the bottom of the tray M, so that by turning the crank-arm D the tray M is also revolved. This motion is continued until the dough begins to leave the sides of the tray, and then the operator takes hold of the knobs N of the tray M and turns it forward and backward on the rollers K as long as may be required to thoroughly knead the dough. When the dough is fully kneaded the tray M is removed from the rollers K and placed upside down on a table, so that the dough falls on the table without being touched by the operator. The dough is then ready for rolling and cutting.

Having thus fully described my invention, I claim as new and desire to secure by Letters Patent—

1. The combination, with the elevated upright rollers having grooves near their lower ends, of the tray or receptacle having the surrounding ring or track entering the said grooves of said rollers and supporting said tray in an elevated position, substantially as and for the purpose set forth.

2. The combination, with the elevated upright rollers having near their lower ends grooves, of the tray or receptacle having the ring or track entering the grooves of said rollers, said tray or receptacle being disposed in an elevated position and having a series of handles at its upper end, substantially as and for the purpose specified.

3. In a kneading-machine, the posts or rods J, secured to the platform A, the rollers K, mounted to revolve on the rods J, and having the grooves K', and the tray or receptacle M, provided with the ring L, in combination with the vertical rod I, attached to the angular arm H, secured to the vertical shaft G, the bevel gear-wheel F, mounted on the shaft G, the bevel gear-wheel E, meshing into the gear-wheel F, the shaft C, carrying the gear-wheel E, and the crank-arm D, secured to the shaft C, substantially as shown and described.

JAMES F. HUGHES.

Witnesses:
J. L. POOLE,
G. W. MATSLER.